United States Patent
Chong et al.

(10) Patent No.: US 7,804,822 B2
(45) Date of Patent: Sep. 28, 2010

(54) METHOD AND APPARATUS FOR DETECTING SUBSCRIBER SERVICE ADDRESS CHANGE

(75) Inventors: Koan Seng Chong, East Brunswick, NJ (US); Brian D. Freeman, Farmingdale, NJ (US); Jay Gabin, Lincroft, NJ (US); Daryl Goins, Holmdel, NJ (US); Galia Merhav, Holmdel, NJ (US); Lina O'Connor, Morganville, NJ (US); Chesla C. Wechsler, Shrewsbury, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1288 days.

(21) Appl. No.: 11/291,023

(22) Filed: Nov. 30, 2005

(65) Prior Publication Data
US 2007/0070990 A1 Mar. 29, 2007

Related U.S. Application Data

(60) Provisional application No. 60/719,106, filed on Sep. 21, 2005.

(51) Int. Cl.
H04L 12/66 (2006.01)

(52) U.S. Cl. ............... 370/356; 370/352; 709/224; 713/1

(58) Field of Classification Search ......... 370/351–356, 370/331, 338, 395.31, 401; 379/142.1, 355.02–355.04; 705/1; 709/227, 245, 224; 713/153, 1
See application file for complete search history.

(56) References Cited

U.S. PATENT DOCUMENTS

| | | | |
|---|---|---|---|
| 6,621,820 B1 * | 9/2003 | Williams et al. ....... | 370/395.31 |
| 6,690,659 B1 | 2/2004 | Ahmed et al. | |
| 6,957,276 B1 * | 10/2005 | Bahl ................... | 709/245 |
| 7,024,548 B1 * | 4/2006 | O'Toole, Jr. ............ | 713/1 |
| 7,082,114 B1 * | 7/2006 | Engwer et al. .......... | 370/331 |
| 7,366,894 B1 * | 4/2008 | Kalimuthu et al. ....... | 713/153 |
| 7,412,521 B2 * | 8/2008 | Olson et al. ............ | 709/227 |
| 7,516,211 B1 * | 4/2009 | Gourlay et al. .......... | 709/224 |
| 7,532,618 B1 * | 5/2009 | Saurabh et al. .......... | 370/352 |
| 7,580,396 B2 * | 8/2009 | Adrangi et al. .......... | 370/338 |
| 2002/0152308 A1 * | 10/2002 | Feather et al. .......... | 709/225 |
| 2003/0002637 A1 * | 1/2003 | Miyauchi et al. ........ | 379/93.01 |

(Continued)

FOREIGN PATENT DOCUMENTS

EP 1 337 089 A2 8/2003

OTHER PUBLICATIONS

Partial EP Search Report for EP Application No. 06121073.8, Jun. 3, 2009, copy consists of 4 unnumbered pages.

(Continued)

*Primary Examiner*—Gerald Gauthier (57) ABSTRACT

A method and apparatus for allowing VoIP service providers to detect service address changes of IP service subscribers are disclosed. Specifically, when a power cycle, e.g., powering off and on, of a particular VoIP endpoint device, such as a Terminal Adaptor (TA) or a soft phone client, is detected, a service provider may assume that the service address of the subscriber has changed. Therefore, appropriate actions can be taken by the service provider to obtain the latest service address from the subscriber to ensure accurate service address information is available, e.g., in support of an emergency call through the particular VoIP endpoint device.

13 Claims, 9 Drawing Sheets

U.S. PATENT DOCUMENTS

| | | | |
|---|---|---|---|
| 2003/0097587 A1* | 5/2003 | Gulick | 713/200 |
| 2004/0181593 A1* | 9/2004 | Kanojia et al. | 709/220 |
| 2005/0148345 A1* | 7/2005 | Kawai et al. | 455/456.3 |
| 2008/0025327 A1* | 1/2008 | Kumar | 370/401 |
| 2009/0037213 A1* | 2/2009 | Eisen | 705/1 |

OTHER PUBLICATIONS

Emmanuel Seurre, Patrick Savelli, Pierre-Jean Pietri, "GPRS for Mobile Internet", 2003, Artech House, Norwood, MA, USA 58053, XP002528226, pp. 319-325.

* cited by examiner

METHOD AND APPARATUS FOR DETECTING SUBSCRIBER SERVICE ADDRESS CHANGE

This application claims the benefit of U.S. Provisional Application No. 60/719,106 filed on Sep. 21, 2005, which is herein incorporated by reference.

The present invention relates generally to communication networks and, more particularly, to a method and apparatus for detecting subscriber service address change in communication networks, e.g., packet networks such as Voice over Internet Protocol (VoIP) networks.

BACKGROUND OF THE INVENTION

One of the key benefits of VoIP network services is to allow a subscriber to move between locations and still make and receive calls using the same phone number. The subscriber can be nomadic and the physical location of a VoIP endpoint can change, unlike an endpoint of the traditional Public Switched Telephone Network (PSTN) counterpart. For instance, a subscriber uses a customer premise based VoIP endpoint device, such as a Terminal Adaptor (TA) or a soft phone client, to access VoIP network services via a broadband access network at a home location. Later, when the subscriber travels to a different location, the subscriber can bring the same TA or soft phone client to access the same subscribed VoIP network services, e.g., using the same phone number making and receiving calls at the same calling rate regardless of location, via a different broadband network.

In order for an Enhanced 911 (E911) dispatcher at a Public Safety Answering Point (PSAP) to effectively provide emergency assistance to an E911 caller, the E911 dispatcher must have the phone number and the service address of the E911 caller. VoIP network providers are required to provide E911 services that are equivalent in reliability and performance to the PSTN counterpart. In a PSTN, E911 caller location is easily identified since the caller location is tied to a fixed service address associated with the calling phone number of a subscriber. However, in a VoIP network, E911 callers are nomadic due to the flexibility of advanced VoIP network services. This nomadic nature makes the identification of the actual service address of an E911 caller extremely difficult. If an E911 dispatcher does not have the correct service address of an E911 caller, an emergency dispatch can be sent to a wrong location. Failure to provide an accurate service address of an E911 caller due to outdated service address information can have serious or even fatal consequences. For example, a nomadic caller who is normally in New York and moves to California will be negatively impacted if an E911 call from the nomadic caller is forwarded to a PSAP in New York. Thus, it is important to properly route an E911 call to an appropriate PSAP.

Therefore, a need exists for a method and apparatus for detecting subscriber service address change in a packet network, e.g., a VoIP network.

SUMMARY OF THE INVENTION

In one embodiment, the present invention provides a method for allowing VoIP service providers to detect service address changes of VoIP service subscribers. Specifically, when a power cycle, e.g., powering off and on, of a particular VoIP endpoint device, such as a Terminal Adaptor (TA) or a soft phone client, is detected, a service provider immediately assumes that the service address of the subscriber has changed; therefore, the appropriate actions can be taken by the service provider to obtain the latest service address from the subscriber to ensure accurate service address information is available when the subscriber or a caller places an emergency call, e.g., E911 call, through the particular VoIP endpoint device. Various embodiments in detecting service address changes by analyzing periodic or non-periodic location management messages sent by a VoIP endpoint device to a Location Management System are disclosed.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
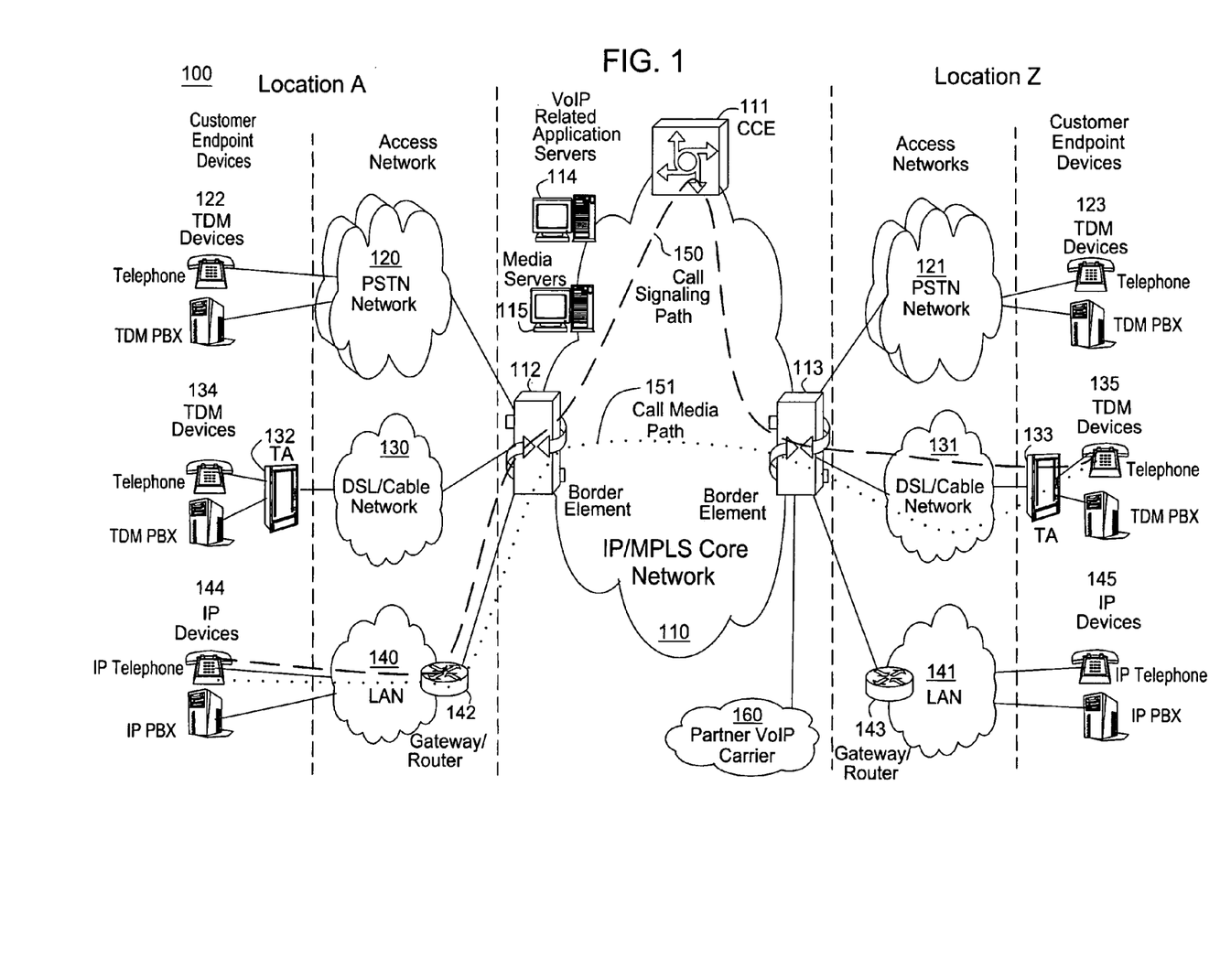
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE, which could be implemented as a Media Gateway Controller, a softswitch or a SIP back-to-back user agent, performs network wide call control related functions as well as interacts with the appropriate VoIP service related servers when necessary. For example, the CCE may function as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

One of the key benefits of VoIP network services is to allow a subscriber to move between locations and still make and receive calls using the same phone number. The subscriber can be nomadic and the physical location of a VoIP endpoint can change, unlike an endpoint of the traditional Public Switched Telephone Network (PSTN) counterpart. For instance, a subscriber uses a customer premise based VoIP endpoint device, such as a Terminal Adaptor (TA) or a soft phone client, to access VoIP network services via a broadband access network at a home location. Later, when the subscriber travels to a different location, the subscriber can bring the same TA or soft phone client to access the same subscribed VoIP network services, e.g., using the same phone number making and receiving calls at the same calling rate regardless of location, via a different broadband network. A soft phone client is a VoIP endpoint device that comprises a personal laptop or a mobile device equipped with a piece of special VoIP client software application to enable VoIP telephony mobility and access without the need of a hardware based endpoint device. A terminal adaptor is a hardware based VoIP endpoint device that provides the necessary interworking functions between analog telephones and packet based access network technologies, such as broadband access networks, to access VoIP network services.

In order for an Enhanced 911 (E911) dispatcher at a Public Safety Answering Point (PSAP) to effectively provide emergency assistance to an E911 caller, the E911 dispatcher must have the phone number and the service address of the E911 caller. VoIP network providers are required to provide E911 services that are equivalent in reliability and performance to the PSTN counterpart. In a PSTN, E911 caller location is easily identified since the caller location is tied to a fixed service address associated with the calling phone number of a subscriber. However, in a VoIP network, E911 callers are nomadic due to the flexibility of advanced VoIP network services. This nomadic nature makes the identification of the actual service address of an E911 caller extremely difficult. If an E911 dispatcher does not have the correct service address of an E911 caller, an emergency dispatch can be sent to a wrong location. Failure to provide an accurate service address of an E911 caller due to outdated service address information can have serious or even fatal consequences.

E911 is an emergency response service that allows emergency personnel at a Public Safety Answering Point (PSAP) to respond to the emergency call and receive the location of a caller placing the emergency call and the calling party phone number. A PSAP is an emergency response center that is responsible for answering E911 calls for emergency assistance from police, fire and ambulance services.

To address this need, the present invention provides a method for allowing VoIP service providers to detect service address changes of VoIP service subscribers. Specifically, when a power cycle, e.g., powering off and on, of a particular VoIP endpoint device, such as a Terminal Adaptor (TA) or a soft phone client, is detected, a service provider immediately assumes that the service address of the subscriber has changed; therefore, the appropriate actions can be taken by the service provider to obtain the latest service address from the subscriber to ensure accurate service address information is available when the subscriber or a caller places an emergency call, e.g., E911 call, through the particular VoIP endpoint device. Various embodiments in detecting service address changes by analyzing periodic or non-periodic location management messages sent by a VoIP endpoint device to a Location Management System are disclosed.

Figure 2:
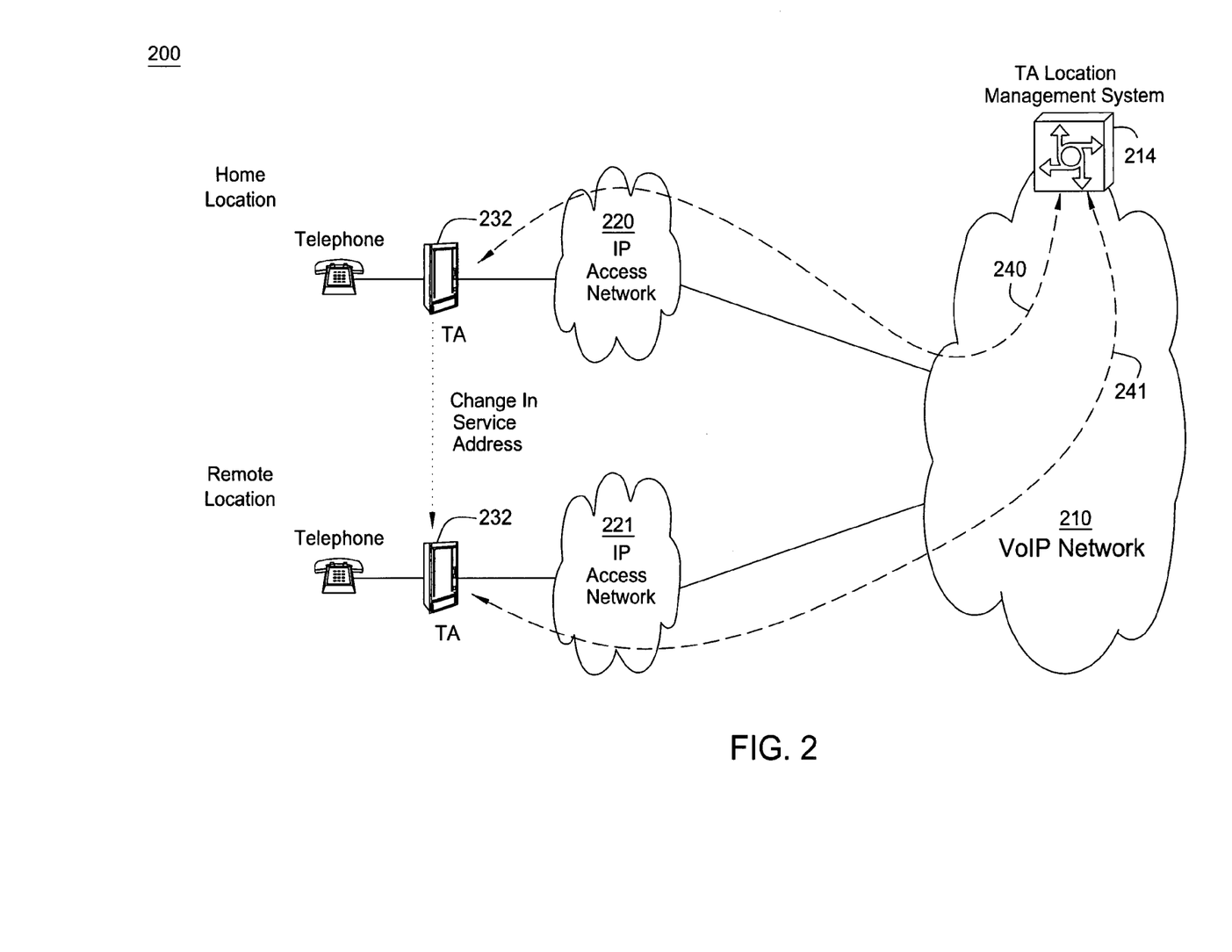
FIG. 2 illustrates an example of detecting subscriber service address change in a VoIP network of the present invention.

FIG. 2 illustrates an example 200 of detecting subscriber service address change in a VoIP network of the present invention. In FIG. 2, a subscriber accesses VoIP services via TA 232 at the home location. TA 232 is connected to IP Access Network 220, e.g., a broadband access network, to interface with VoIP network 210. In addition, TA 232 sends periodic or non-periodic location management messages to Location Management System 214 using flow 240 to provide change of service address indication. TA 232 sends location management messages that comprise information that can be used to detect a change of service address by Location Management System 214. In one embodiment, the location management message is formatted to be parseable, e.g., using the Extensible Markup Language (XML) standard. XML is a standard for defining and describing the structure and format of data.

At a later time, the subscriber travels to the remote location and uses TA 232, the same TA, to access VoIP services. TA 232 is connected to IP Access Network 221, e.g., a different broadband access network, to interface with VoIP network 210. Upon powering up at the remote location, TA 232 begins sending periodic or non-periodic location management messages to Location Management System 214 using flow 241. When Location Management System 214 receives the location management message, Location Management System 214 analyzes the information in the location management message and detects that a change in service address has occurred. Location Management System 214 can then instruct VoIP network 210 to take the appropriate action in response to the detected change of service address. For instance, VoIP network 210 can block the subscriber from making and receiving phone calls until the latest service address information is obtained from the subscriber.

Figure 3:
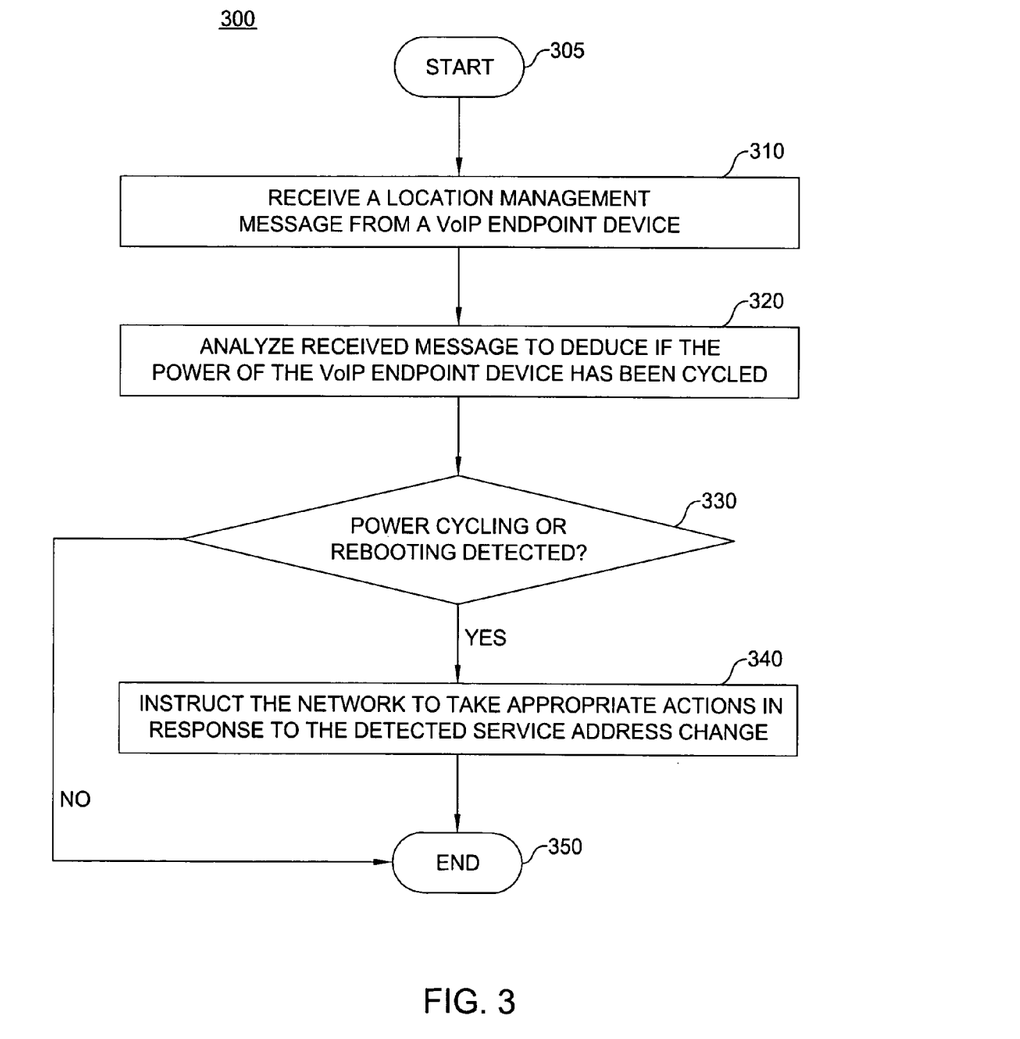
FIG. 3 illustrates a flowchart of a general method for detecting subscriber service address change using power cycle indication in a packet network, e.g., a VoIP network, of the present invention.

There are various methods that can be used to embed different location management information contents in a location management message and to facilitate the detection of a change of service address by analyzing these embedded location management information contents. FIG. 3 illustrates a flowchart of a general method 300 for detecting subscriber service address change using power cycle indication in a packet network, e.g., a VoIP network, of the present invention. Method 300 starts in step 305 and proceeds to step 310.

In step 310, the method receives a location management message from a particular VoIP endpoint device, such as a TA or a soft phone client. Location management messages are sent by the VoIP endpoint device on a periodic (e.g., hourly, daily, and so on) or on a non-periodic basis. The location management message is received by a Location Management System.

In step 320, the method analyzes the received location management to deduce if the VoIP endpoint device has been power cycled or rebooted. For instance, the Location Management System uses the information embedded in the received location management message to deduce if the VoIP endpoint device, which originates the location management message, has been powered off and then on or rebooted.

In step 330, the method checks if power cycling or rebooting of the VoIP endpoint device has been detected. There are various embodiments that facilitate the detection of a power cycling of a VoIP endpoint device. Method 400 and method 600 as discussed below provide the details of different embodiments used to provide power cycling or rebooting detection of a VoIP endpoint device. If power cycling or rebooting of the VoIP endpoint device has been detected, the method proceeds to step 340; otherwise, the method proceeds to step 350. When a power cycling or rebooting is detected, a change of physical location is automatically assumed.

In step 340, the method instructs the network to take the appropriate actions in response to the detected change of service address. For instance, the network may block the VoIP endpoint device from establishing and receiving calls with the network. The method ends in step 350.

Figures 4, 4A:
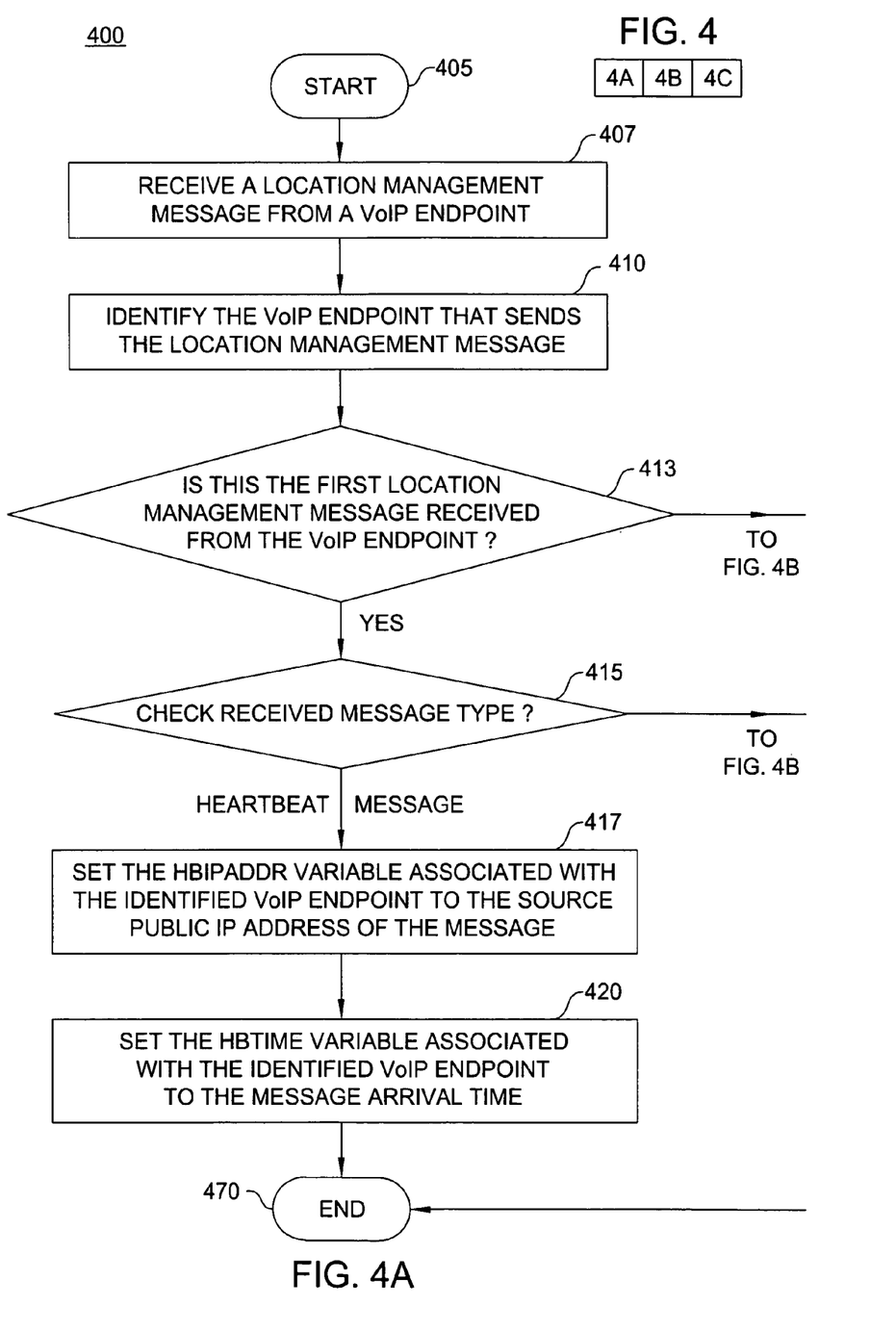
FIG. 4 illustrates a flowchart of a method for detecting subscriber service address change using a heartbeat algorithm in one embodiment in a packet network, e.g., a VoIP network, of the present invention.
Figure 4B:
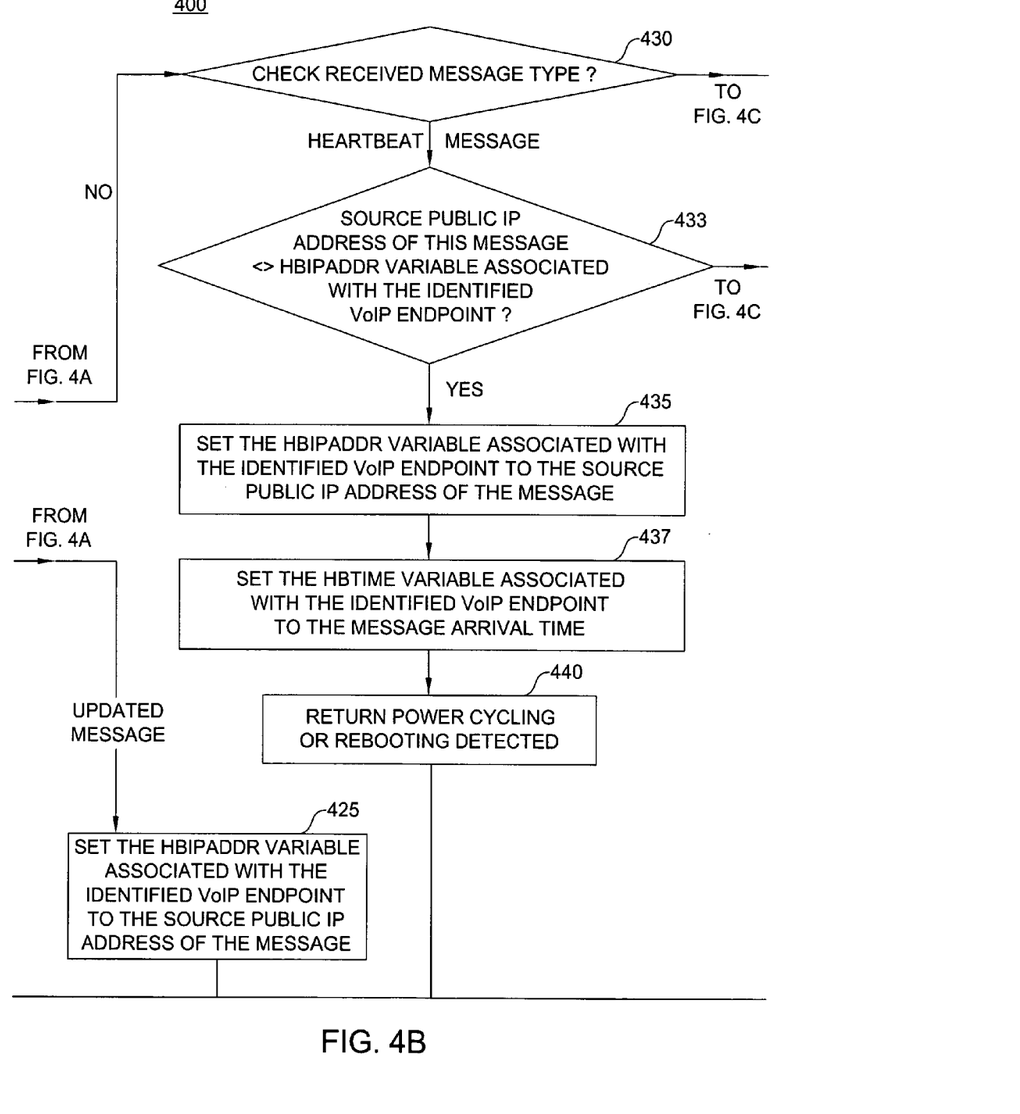
Figure 4C:
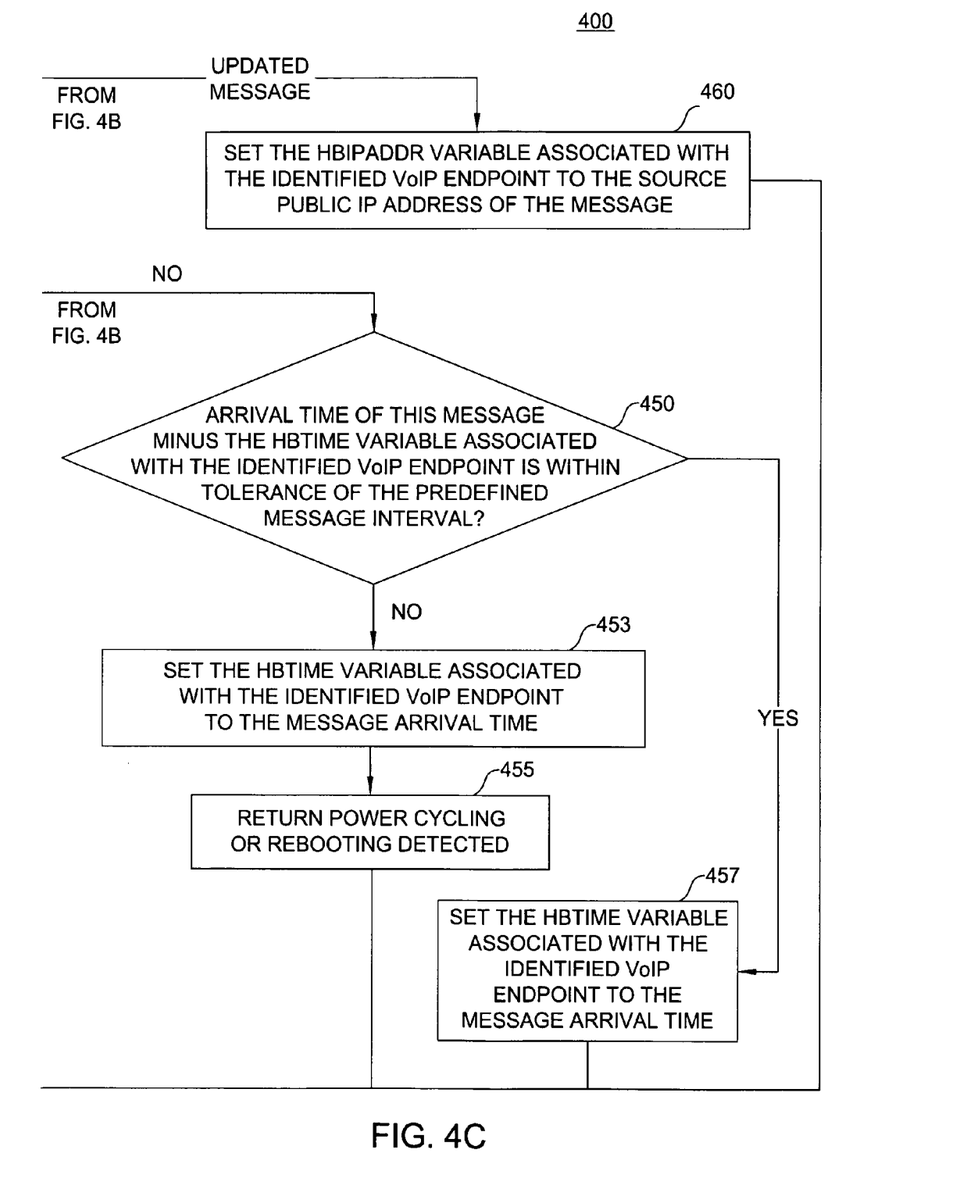

FIG. 4 illustrates a flowchart of a method 400 for detecting subscriber service address change using a heartbeat method in one embodiment of the present invention in a packet network, e.g., a VoIP network, of the present invention.

The essence of method 400 is to look for key discrepancies in the timing or content of periodic messages sent by a VoIP endpoint device to a Location Management System. The underlying assumption is that if a VoIP endpoint has been power cycled and, hence a change in physical location is deduced, then these periodic location management messages, such as a heartbeat message, will arrive at different times or from different IP addresses. Method 400 will indicate a power cycling or rebooting that is a result of a change in service address, when it detects a change in the arrival times of these periodic heartbeat messages or in certain cases when update messages begin to come from a different IP address.

Figure 5:
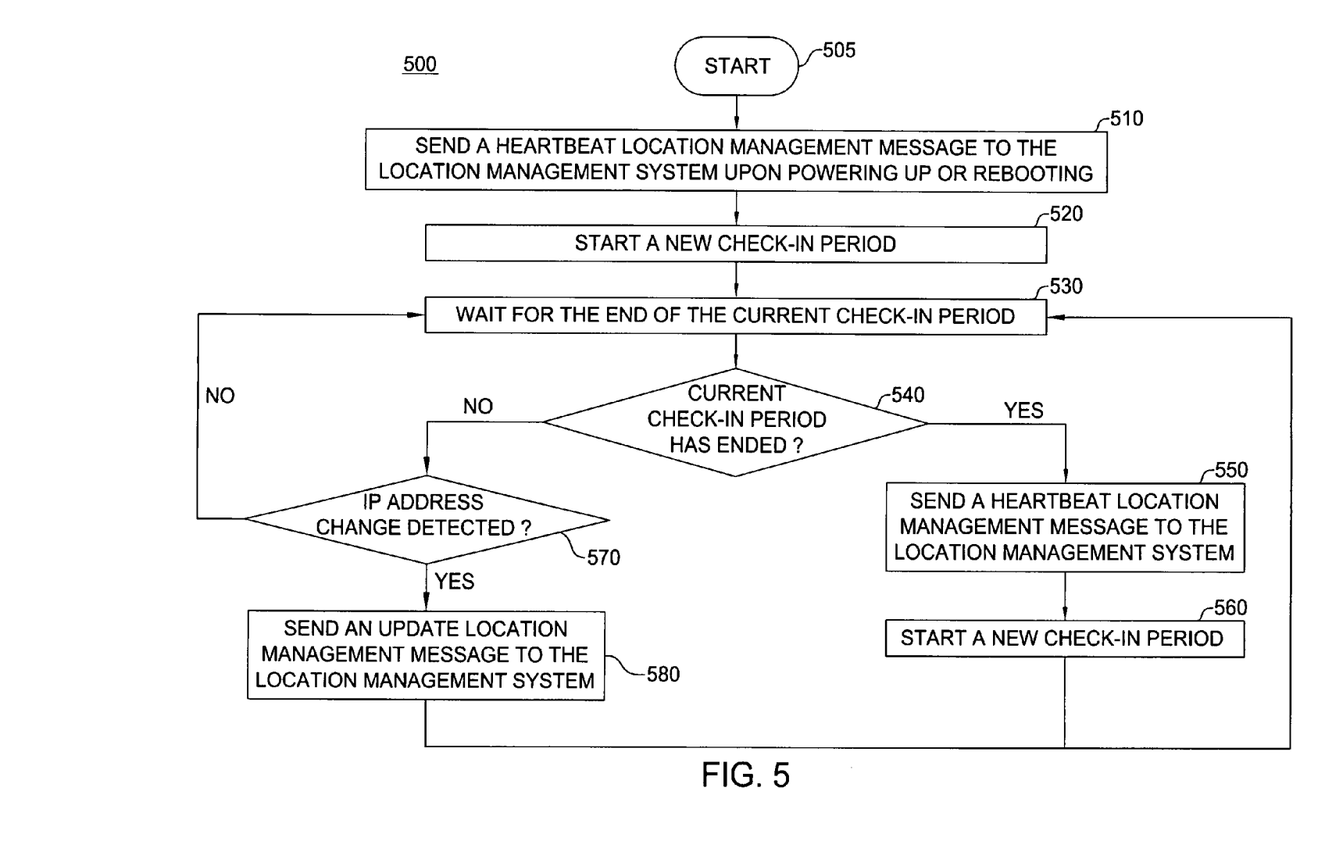
FIG. 5 illustrates a flowchart of a method for sending location management messages to facilitate detection of subscriber service address change by a heartbeat algorithm in one embodiment in a packet network, e.g., a VoIP network, of the present invention.

There are two key components to the heartbeat method. First, the VoIP endpoints must send heartbeat messages to a Location Management System in the VoIP network on a periodic basis with cycles beginning on either VoIP endpoint device power-up or reboot. The VoIP endpoint devices must also send update messages to indicate a change in IP address that was not accompanied by a power-up or reboot. Method 500 as discussed below provides the details of the sending of these location management messages by a VoIP endpoint device. Second, the Location Management System residing in a VoIP network must execute the heartbeat method, method 400, upon receiving the heartbeat or update messages from a VoIP endpoint device. The arrival time and the publicly routable IP address of these messages must be available to the heartbeat method.

There are two types of location management messages used by the heartbeat method. A VoIP endpoint device sends a heartbeat message upon either powering up or rebooting. Then at periodic intervals the VoIP endpoint device sends additional repeating heartbeat messages to the Location Management System in the VoIP network. The time period between each periodic heartbeat message is a predefined message interval value that is a configurable parameter set by the network provider. Each VoIP endpoint device may be set to a different message interval value by the network provider. A VoIP endpoint device also sends an update message to indicate if the IP address of the VoIP endpoint device changes. The update messages may be sent at any time and signal a normal IP address change which is expected in a Dynamic Host Configuration Protocol (DHCP) network. This update message must be distinguishable by the Location Management System from a periodic heartbeat. DHCP is a standard protocol for assigning IP addresses dynamically to network nodes in a network.

In method 400, the HBTIME variable is a timestamp used to record the last heartbeat location management message arrival time and it is initialized to a null value. The HBIPADDR variable is the publicly routable IP address of the most recent heartbeat location management message or the most recent update location management message from a particular VoIP endpoint device. HBIPADDR is initialized to a null value.

Method 400 is executed by a Location Management System in a VoIP network. Method 400 starts in step 405 and proceeds to step 407.

In step 407, the method receives a location management message from a VoIP endpoint device.

In step 410, the method Identifies the VoIP endpoint that sends the location management message. In one embodiment, the VoIP endpoint can be identified by a node address, e.g., a Media Access Control (MAC) address of the VoIP endpoint device embedded in the location management message. Note that in one embodiment, the MAC address is a 48 bit hardware address assigned by the Institute of Electrical and Electronic Engineers (IEEE) that uniquely identifies a node within a network. In another embodiment, the VoIP endpoint can be identified by a unique key assigned by the network provider to the VoIP endpoint device that is embedded in the location management message.

In step 413, the method checks if the received message is the very first location management message received from the identified VoIP endpoint device. If the received message is the very first location management message received from the identified VoIP endpoint device, the method proceeds to step 415; otherwise, the method proceeds to step 430.

In step 415, the method checks the received location management message type. If the received message is a heartbeat message, the method proceeds to step 417. If the received message is an update message, the method proceeds to step 425.

In step 417, the method sets the HBIPADDR variable associated with the identified VoIP endpoint device to the source IP address of the IP packet that carries the heartbeat message.

In step 420, the method sets the HBTIME variable associated with the identified VoIP endpoint device to the heartbeat message arrival time.

In step 425, the method sets the HBIPADDR variable associated with the identified VoIP endpoint device to the source IP address of the IP packet that carries the update message.

In step 430, the method checks the received location management message type. If the received message is a heartbeat message, the method proceeds to step 433. If the received message is an update message, the method proceeds to step 460.

In step 433, the method checks if the source IP address of the IP packet that carries the heartbeat message is not the same as the HBIPADDR variable associated with the identified VoIP endpoint device. If the source IP address of the IP packet that carries the heartbeat message is not the same as the HBIPADDR variable associated with the identified VoIP endpoint device, the method proceeds to step 435; otherwise, the method proceeds to step 450.

In step 435, the method sets the HBIPADDR variable associated with the identified VoIP endpoint device to the source IP address of the IP packet that carries the heartbeat message.

In step 437, the method sets the HBTIME variable associated with the identified VoIP endpoint device to the heartbeat message arrival time.

In step 440, the method returns a power cycling or rebooting detected condition.

In step 450, the method checks if the difference of the current heartbeat message arrival time and the value stored in the HBTIME variable is within the acceptable tolerance of the predefined periodic message interval value. For instance, if the predefined periodic message interval value is 24 hours and the acceptable tolerance is 1 minute, then the received heartbeat message is considered within acceptable tolerance if the difference of the current heartbeat message arrival time and the value stored in the HBTIME variable is a value between 23 hours and 59 minutes to 24 hours and 1 minute. If the difference of the current heartbeat message arrival time and the value stored in the HBTIME variable is within the acceptable tolerance of the predefined periodic message interval value, the method proceeds to step 457; otherwise, the method proceeds to step 453.

In step 453, the method sets the HBTIME variable associated with the identified VoIP endpoint device to the heartbeat message arrival time.

In step 455, the method returns a power cycling or rebooting detected condition.

In step 457, the method sets the HBTIME variable associated with the identified VoIP endpoint device to the heartbeat message arrival time.

In step 460, the method sets the HBIPADDR variable associated with the identified VoIP endpoint device to the source IP address of the IP packet that carries the update message. The method ends in step 470.

FIG. 5 illustrates a flowchart of a method 500 for sending location management messages to facilitate detection of subscriber service address change by a heartbeat algorithm in one embodiment in a packet network, e.g., a VoIP network, of the present invention. Method 500 is executed by a VoIP endpoint device. Method 500 starts in step 505 and proceeds to step 510.

In step 510, the method sends a heartbeat message to the Location Management System immediately after powering up or rebooting.

In step 520, the method starts a new check-in period. A check-in period is the periodic message time interval between two successive heartbeat messages under normal operating conditions of a VoIP endpoint device.

In step 530, the method waits for the end of the current check-in period.

In step 540, the method checks if the current check-in period has ended. If the current check-in period has ended, the method proceeds to step 550; otherwise, the method proceeds to step 570.

In step 550, the method sends a heartbeat message to the Location Management System in the VoIP network. The heartbeat message comprises information to identify the heartbeat message type and to uniquely identify the VoIP endpoint device in a VoIP network.

In step 560, the method starts a new check-in period.

In step 570, the method checks if a change in IP address is detected. Under normal operating conditions of a VoIP endpoint device, an IP address change can be triggered by the DHCP. If a change in IP address is detected, the method proceeds to step 580; otherwise, the method proceeds back to step 530.

In step 580, the method sends an update message to the Location Management System in the VoIP network. The update message comprises information to identify the update message type and to uniquely identify the VoIP endpoint device in a VoIP network. The method ends when the VoIP endpoint device is powered down or rebooted.

Figure 6:
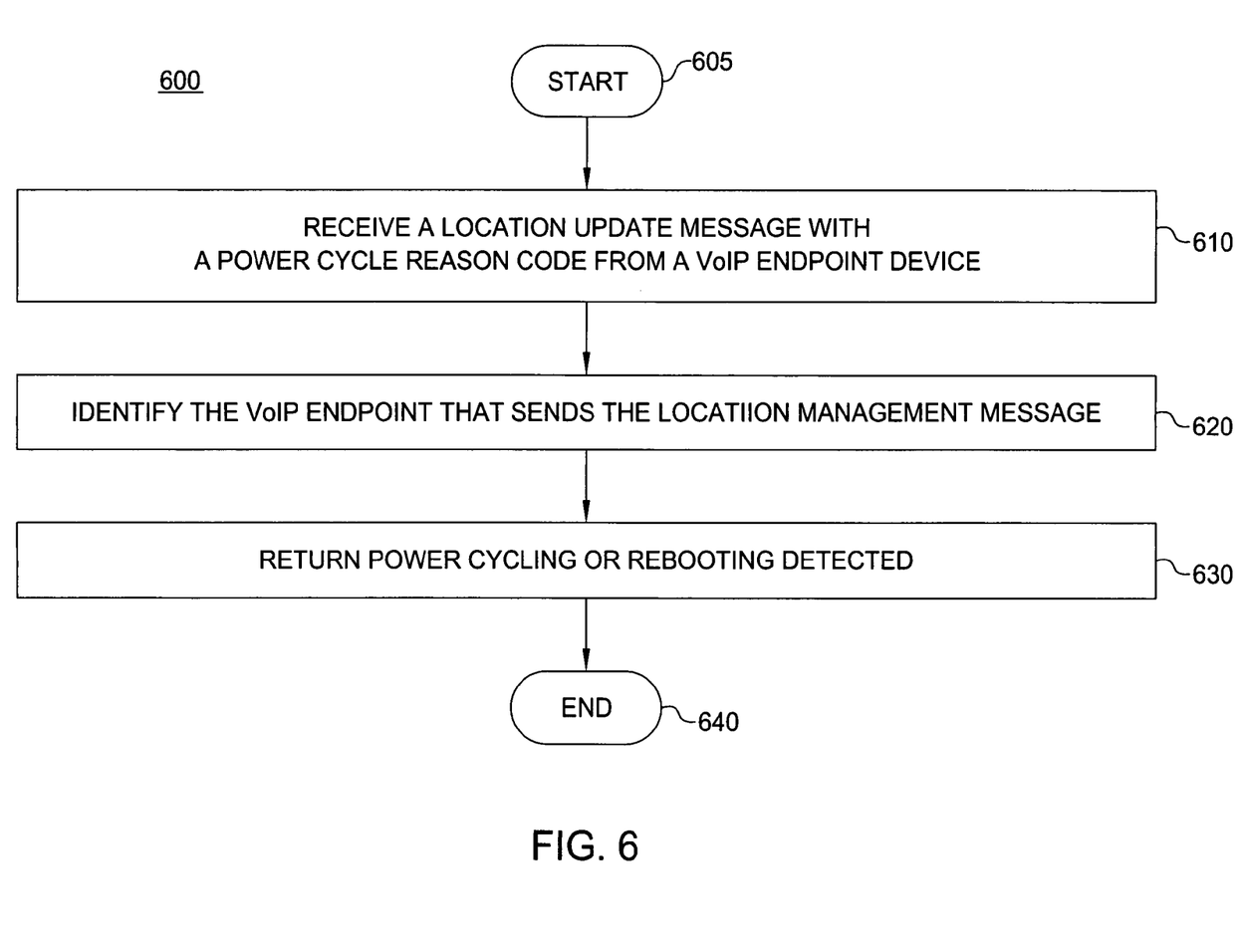
FIG. 6 illustrates a flowchart of a method for detecting subscriber service address change using a power cycle message in one embodiment in a packet network, e.g., a VoIP network, of the present invention.

FIG. 6 illustrates a flowchart of a method 600 for detecting subscriber service address change using a power cycle message in one embodiment in a packet network, e.g., a VoIP network, of the present invention. Method 600 starts in step 605 and proceeds to step 610.

In step 610, the method receives a location update message with a power cycle reason code, e.g., broadly defined as a power cycle message from a particular VoIP endpoint device, such as a TA or a soft phone client. Power cycle messages are sent by a VoIP endpoint device on a non-periodic basis. The power cycle message is received by a Location Management System in a VoIP network. In one embodiment, a power cycle message is sent by a VoIP endpoint device to positively indicate that the VoIP endpoint device has been recently powered on or the soft phone client application has been launched or enabled. The time of when the VoIP device has been powered on can be included in the power cycle message as well. If it is included, the allowed value of the time difference between the time when the message is received and the time when the device was powered on is a configurable parameter set by the network provider. In another embodiment, a power cycle message is sent by a VoIP endpoint device to positively indicate that the VoIP endpoint device is in the process of powering off or the software client application is in the process of terminating or being disabled.

In step 620, the method identifies the VoIP endpoint that sends the power cycle message. In one embodiment, the VoIP endpoint can be identified by a node address, e.g., a Media Access Control (MAC) address of the VoIP endpoint device embedded in the power cycle message. In another embodiment, the VoIP endpoint can be identified by a unique key assigned by the network provider to the VoIP endpoint device that is embedded in the power cycle message.

In step 630, the method returns a power cycling or rebooting detected condition. The method ends in step 640.

In another embodiment, a location management message that indicates a router or gateway device between a VoIP endpoint device and the VoIP network has changed, then it can be concluded that a change of service address is detected by the Location Management System. This message comprises the MAC address of the changed router or gateway device in a periodic or non-periodic communication.

In another embodiment, a location management message that comprises physical location information such as coordinates of the Global Positioning System (GPS) is used to indicate the current GPS position of the VoIP endpoint device. If the current GPS position does not matched the previously reported GPS position, then it can be concluded that a change of service address is detected by the Location Management System. A GPS is a radio positioning system which derives location information via satellite to enable the accurate pinpointing of GPS equipped moving objects.

It should be noted that the above disclosure pertaining to reboot is just one exemplary mechanism of data that can be carried in messages to a location management server. Movement information can be obtained or deduced from other mechanisms such as a mercury switch or an accelerometer.

Figure 7:
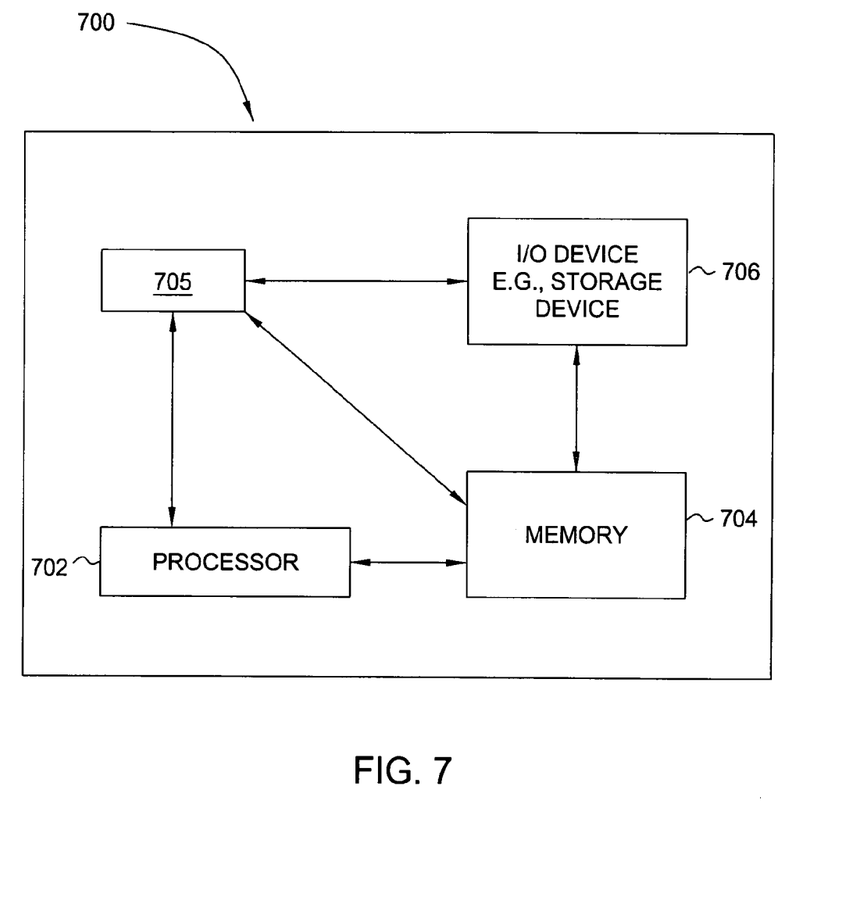
FIG. 7 illustrates a high level block diagram of a general purpose computer suitable for use in performing the functions described herein.

FIG. 7 depicts a high level block diagram of a general purpose computer suitable for use in performing the functions described herein. As depicted in FIG. 7, the system 700 comprises a processor element 702 (e.g., a CPU), a memory 704, e.g., random access memory (RAM) and/or read only memory (ROM), a module 705 for detecting subscriber service address change, and various input/output devices 706 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 705 for detecting subscriber service address change can be loaded into memory 704 and executed by processor 702 to implement the functions as discussed above. As such, the present process 705 for detecting subscriber service address change (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting a service address change in a communication network, comprising:

receiving a plurality of location management messages from an endpoint device in said communication network;

detecting an occurrence of a power cycle or a reboot event based on said plurality of location management messages for said endpoint device, wherein said detecting comprises:

recording a timestamp associated with each of said plurality of location management messages; and detecting said occurrence of said power cycle or said reboot event if a difference in time for successive location management messages is greater than a predefined threshold; and determining that a service address change is detected for said endpoint device based upon said occurrence of said power cycle or said reboot event being detected.

2. The method of claim 1, wherein said communication network is a Voice over Internet Protocol (VoIP) network or a Service over Internet Protocol (SoIP) network.

3. The method of claim 1, wherein said endpoint device comprises at least one of: a Terminal Adaptor (TA) or a soft phone client.

4. The method of claim 1, wherein said occurrence of said power cycle or said reboot event is determined by a Location Management System.

5. The method of claim 1, wherein said plurality of location management messages comprises heartbeat messages.

6. The method of claim 5, wherein said timestamp records an arrival time of each said heartbeat messages.

7. The method of claim 1, wherein said plurality of location management messages is in accordance with an Extension Markup Language (XML) standard.

8. The method of claim 1, wherein at least one of said plurality of location management messages is received on a periodic basis, and wherein at least one of said plurality of location management messages is received on a non-periodic basis.

9. A computer-readable medium having stored thereon a plurality of instructions, the plurality of instructions including instructions which, when executed by a processor, cause the processor to perform steps of a method for detecting a service address change in a communication network, comprising:
   receiving a plurality of location management messages from an endpoint device in said communication network;
   detecting an occurrence of a power cycle or a reboot event based on said plurality of location management messages for said endpoint device, wherein said detecting comprises:
      recording a timestamp associated with each of said plurality of location management messages; and
      detecting said occurrence of said power cycle or said reboot event if a difference in time for successive location management messages is greater than a predefined threshold; and
   determining that a service address change is detected for said endpoint device based upon said occurrence of said power cycle or said reboot event being detected.

10. The computer-readable medium of claim 9, wherein said communication network is a Voice over Internet Protocol (VoIP) network or a Service over Internet Protocol (SoIP) network.

11. The computer-readable medium of claim 9, wherein said endpoint device comprises at least one of: a Terminal Adaptor (TA) or a soft phone client.

12. The computer-readable medium of claim 9, wherein said plurality of location management messages comprises heartbeat messages.

13. An apparatus for detecting a service address change in a communication network, comprising:
   means for receiving a plurality of location management messages from an endpoint device in said communication network;
   means for detecting an occurrence of a power cycle or a reboot event based on said plurality of location management messages for said endpoint device, wherein said detecting means comprises:
      means for recording a timestamp associated with each of said plurality of location management messages; and
      means for detecting said occurrence of said power cycle or said reboot event if a difference in time for successive location management messages is greater than a predefined threshold; and
   means for determining that a service address change is detected for said endpoint device based upon said occurrence of said power cycle or said reboot event being detected.

* * * * *